United States Patent
Imbornone et al.

(10) Patent No.: US 11,662,751 B1
(45) Date of Patent: May 30, 2023

(54) COMBINATION CHECK AND RELIEF VALVE ASSEMBLY FOR A BLOWER MANIFOLD

(71) Applicant: AIRTECH GROUP, INC., Rutherford, NJ (US)

(72) Inventors: Vincent Imbornone, Union, NJ (US); Raphael Sagher, Alpine, NJ (US)

(73) Assignee: Airtech Group, Inc., Rutherford, NJ (US)

( * ) Notice: Subject to any disclaimer, the term of this patent is extended or adjusted under 35 U.S.C. 154(b) by 0 days.

(21) Appl. No.: 17/554,430

(22) Filed: Dec. 17, 2021

(51) Int. Cl.
*G05D 16/04* (2006.01)
*F16K 11/10* (2006.01)

(52) U.S. Cl.
CPC ........ *G05D 16/0402* (2019.01); *F16K 11/105* (2013.01)

(58) Field of Classification Search
CPC ........ Y10T 137/2605; Y10T 137/7842; G02B 7/007
See application file for complete search history.

(56) References Cited

U.S. PATENT DOCUMENTS

| | | | | |
|---|---|---|---|---|
| 3,451,416 A | * | 6/1969 | Nyberg | F16K 17/0473 137/115.18 |
| 3,633,613 A | * | 1/1972 | Julow | F16K 15/148 137/854 |
| 4,044,746 A | * | 8/1977 | Kaye | F02M 37/0029 123/514 |
| 4,057,072 A | * | 11/1977 | Cook | F16K 17/0433 137/115.18 |
| 4,502,502 A | * | 3/1985 | Krug | A61M 39/24 137/526 |
| 5,707,356 A | * | 1/1998 | Paul | A61M 1/742 604/167.03 |
| 6,142,980 A | * | 11/2000 | Schalk | A61M 1/367 604/129 |

* cited by examiner

*Primary Examiner* — Robert K Arundale
(74) *Attorney, Agent, or Firm* — Thomas M. Galgano; Galgano IP Law PLLC (57) ABSTRACT

A combination check and relief valve assembly especially designed as a manifold attachment to the exhaust port of a blower and which adapts to the blower's exhaust to maintain pressure within the manifold to a certain range. The combination valve features a manifold having an inner channel which connects to the discharge port of the blower via an inlet port, a check valve assembly having a spring-loaded ball disposed for periodic operative engagement with the inlet port for the prevention of backflow of the fluid discharge and a relief valve assembly mounted in a side channel of the manifold for releasing and venting the fluid discharge through a relief vent port upon an excessive pressure buildup. The relief valve includes a spring-loaded plunger which opens and closes the relief vent port. The combined effect of the two valves helps to maintain the pressure in the manifold to a set adjustable desired range.

18 Claims, 5 Drawing Sheets

COMBINATION CHECK AND RELIEF VALVE ASSEMBLY FOR A BLOWER MANIFOLD

BACKGROUND OF THE INVENTION

1 Field of the Invention

The invention relates to the field of pressure regulating devices. More particularly, the invention pertains to a valve assembly which combines a check valve and a relief valve in a single manifold especially intended for vacuum pumps and blowers. More specifically, it relates to a valve assembly which has both a check valve that closes under low pressure conditions to prevent backflow and a relief valve that opens under high pressure conditions to limit the pressure in a system arranged in a manifold. This assembly allows for the regulation of pressure in a system within a range determined by the settings of the compression springs in the check valve and relief valve assemblies.

2. Description of Related Art

Both check valves and relief valves are well known in the field of discharge gas devices, such as, e.g., so-called "blowers" and "side channel blowers". The pressure created at the outlet of blowers must be controlled in order to protect internal components of the blower. Relief valves are activated once the pressure in the system is high enough that it can compress the compression spring within the valve to create an opening for fluid to flow through and exit the system. If a blockage occurs to the outlet of a blower without a relief valve, flow will be restricted resulting in a high level of pressure building up in the system.

A check valve allows flow in one direction and automatically prevents it in another. If the flow of fluid is regular through the outlet, then the check valve is open allowing fluid flow but if there is back pressure and fluid flow is reversed then the check valve closes stopping fluid from flowing back through the inlet of the valve.

Most of the conventional check valves presently used for discharge gas devices are reliant on a single discharge outlet which has an opening controlled by the use of a compression spring. However, so far as is known, none of the conventional blowers employ a combination check and relief valve assembly for blowers of the type herein disclosed which affords a dual response to both high pressure gas build up and backflow in a relatively simple, yet highly effective and unique manner as afforded by the present invention.

Accordingly, it is an object of the present invention to provide a novel check and relief valve assembly especially intended for discharge gas devices, such as blowers, for the release of excess or high-pressure gas buildup of the fluid discharge at the discharge port of the blower and which also prevents backflow through the inlet of the valve.

It is a further object of the present invention to provide such a novel combination check and relief valve assembly arranged in a manifold which is relatively simple in design, compact, easy and highly effective to use and inexpensive to manufacture.

It is more particularly an object of the present invention to provide such a novel combination pressure check and a relief valve assembly for blower manifolds which employs a pressure control valve assembly for dynamically regulating the blower's exhaust flow.

SUMMARY OF THE INVENTION

Certain of the foregoing and related objects of the invention are attained according to the present invention by the provision of a combination check and relief valve assembly for maintaining a predetermined pressure range at the fluid discharge outlet port of a blower comprising a manifold having an inlet port for receiving the fluid discharge from the outlet port of the blower and a discharge port for discharge of the fluid discharge of the blower, a hollow interior chamber defining a passageway from said inlet port to said discharge port of said manifold for the fluid discharge from the blower and a relief vent port in communication with said interior chamber of said manifold. The assembly further includes a check valve mounted in said manifold for preventing a backflow of the fluid discharge back through said inlet port upon an excessive pressure drop in said chamber of said manifold and a relief valve mounted in said manifold for releasing and venting the fluid discharge of the blower through said relief vent port in said manifold to the atmosphere upon an excessive pressure buildup in said chamber of said manifold of the fluid discharge received from the blower. Preferably, said relief valve comprises a plunger movable reciprocally between a normally closed position relative to said relief vent port in which it blocks the fluid discharge through said relief vent port and an open position in which it is spaced from said relief vent port to permit fluid discharge through said relief vent port. Desirably, said relief valve additionally includes a coil spring for normally biasing said plunger into said closed position and said manifold has a side channel having an inner open end opening onto said interior chamber thereof and an outer open end which is internally-threaded and wherein said inner end thereof is dimensioned and configured to define a valve seat for said plunger.

Advantageously, said plunger has an enlarged disc-shaped plunger head having an inner face and an outer face, the latter of which is configured for mating sealing engagement with said valve seat defined by said inner open end of said side channel, and an axially-aligned shaft coupled to said inner face of said plunger head and wherein said coil spring is disposed on said shaft. Preferably, said relief valve additionally includes tension adjustment means for adjusting the compressive force applied by said coil spring on said plunger head. In a preferred embodiment of the invention, said tension adjustment means comprises a wheel having a threaded periphery for threaded engagement with said internally-threaded outer end of said side channel of said manifold and a central hub having an axially-extending throughbore in which said shaft of said plunger is slidably mounted so that said relief valve coil spring is disposed and extends between said adjustment wheel and said plunger head. Desirably, said adjustment wheel has a plurality of radially-spaced-apart holes arranged between said central hub and said threaded periphery thereof.

Most advantageously, said relief valve additionally includes an end cap having an externally-threaded cylindrical inner end portion threadably engageable with said internally-threaded outer end of said side channel of said manifold. The end cap has a central opening which communicates with said holes of said adjustment wheel and, in turn, said inner open end of said side channel to permit the release and venting of the fluid discharge of the blower through said side channel of said manifold and said central opening of said end cap upon an excess pressure build up in said chamber of said manifold of the fluid discharge from the blower. Preferably, said end cap has a circular-shaped periphery.

In a particularly preferred embodiment of the invention, said manifold inlet port is generally cylindrical and defines a generally circular inlet port having an annular inner portion which is configured and dimensioned to define an annular check valve seat. Further, said check valve comprises a valve ball reciprocally movable between a normally closed position relative to said check valve seat in which it blocks said inlet port and an open position in which it is spaced from said check valve seat to allow the fluid discharge from the blower to enter said inlet port, flow into said interior channel of said manifold and exit through said discharge port of said manifold. Preferably, said check valve additionally including a check valve coil spring for normally biasing said valve ball into said closed position thereof. Advantageously, said check valve additionally includes tension adjustment means for adjusting the compressive force applied by said check valve coil spring on said valve ball. Desirably, said manifold is elongated and has a front end and a rear end wherein said inlet port is formed in said front end thereof and said rear end defines a cylindrical rear opening which is internally threaded and said tension adjustment means additionally includes a cylindrical end cap having an enlarged outer head portion and a reduced diameter, externally-threaded, inner neck portion.

Most advantageously, said check valve end cap has a slotted cylindrical cage secured to said inner neck portion of said check valve end cap which is configured and dimensioned for receipt therein of a portion of said check valve coil spring so that said check valve coil spring is sandwiched between said cage and said ball. Most desirably, said check valve end cap has an Allen key port formed therein to facilitate rotational adjustment of said check valve end cap in said rear end of said manifold whereby the internal pressure required to open said check valve can be raised or lowered. Preferably said manifold has a rectangular front end portion which defines said generally circular inlet port of said manifold and wherein said annular inner portion thereof defines a rounded shoulder which serves as said check valve seat.

In a still further preferred embodiment of the invention, said check valve additionally includes an O-ring disposed adjacent to said annular inner portion to effect sealing engagement thereof with said ball when in its normally closed position thereof, and wherein said check valve additionally includes a second O-ring mounted between said end cap and said rear end of said manifold to effect sealing engagement therebetween. In addition, the manifold has a generally rectangular main housing and a second discharge port adjacent to, but spaced from, said discharge port. The manifold desirably has dual tubular exhaust stacks extending outwardly from, and generally perpendicular to, said manifold, one of which defines said discharge port and the other of which defines said second discharge port, and wherein said stacks each have an inner end in communication with said interior chamber of said manifold and are generally disposed at a right angle to said elongated manifold.

In yet another preferred embodiment of the invention, said front end portion has a plurality of bolt holes for the receipt therein of a plurality of bolts for attaching said manifold to a blower. It is also advantageous that said manifold has a hollow cylindrical side extension having a throughbore with an inner open end extending into one of said stacks and an internally-threaded, outer open end. The valve assembly additionally includes a pressure gauge connector that has an externally-threaded inner end for threaded engagement with said outer open end. Most desirably, said ball and said O-rings in said check valve assembly are made from PTFE.

Certain of the foregoing and related objects are also readily attained according to the present invention by the provision of a novel check relief valve for maintaining the level of pressure present in a system by the fluid discharge at the discharge port of a blower, comprising a manifold having an inlet end attachable to the discharge port of a blower, and an inner channel having an inlet port for receiving the fluid discharge of the blower and two outlets, one with a direct path to the outlet of the system and one controlled by the relief valve aspect which will activate to allow discharge from the manifold as soon as a preset level of pressure is reached in the system.

Preferably, the present invention relates to a combination check-relief valve for the maintenance of a pressure range generated by the fluid discharge fluid at the discharge port of a blower, comprising a manifold having an inlet attachable to the discharge port of a pump and an inner channel having an inlet port for receiving the fluid discharge of a blower and an outlet port for discharge of said fluid received from said discharge part of a blower. Relief valve means are disposed in said manifold for effecting or triggering the discharge of fluid in response to a pre-determined pressure level rise in the manifold cause by said exhaust fluid flow discharge from the blower.

BRIEF DESCRIPTION OF THE DRAWINGS

Other objects and features of the present invention will become apparent from the detailed description considered in connection with the accompanying drawings, which disclose a preferred embodiment of the invention. It is to be understood that the drawings are to be used for the purpose of illustration only and not as a definition of the limits of the invention. In the drawings.

DETAILED DESCRIPTION OF THE PREFERRED AND ILLUSTRATED EMBODIMENT

Figure 1:
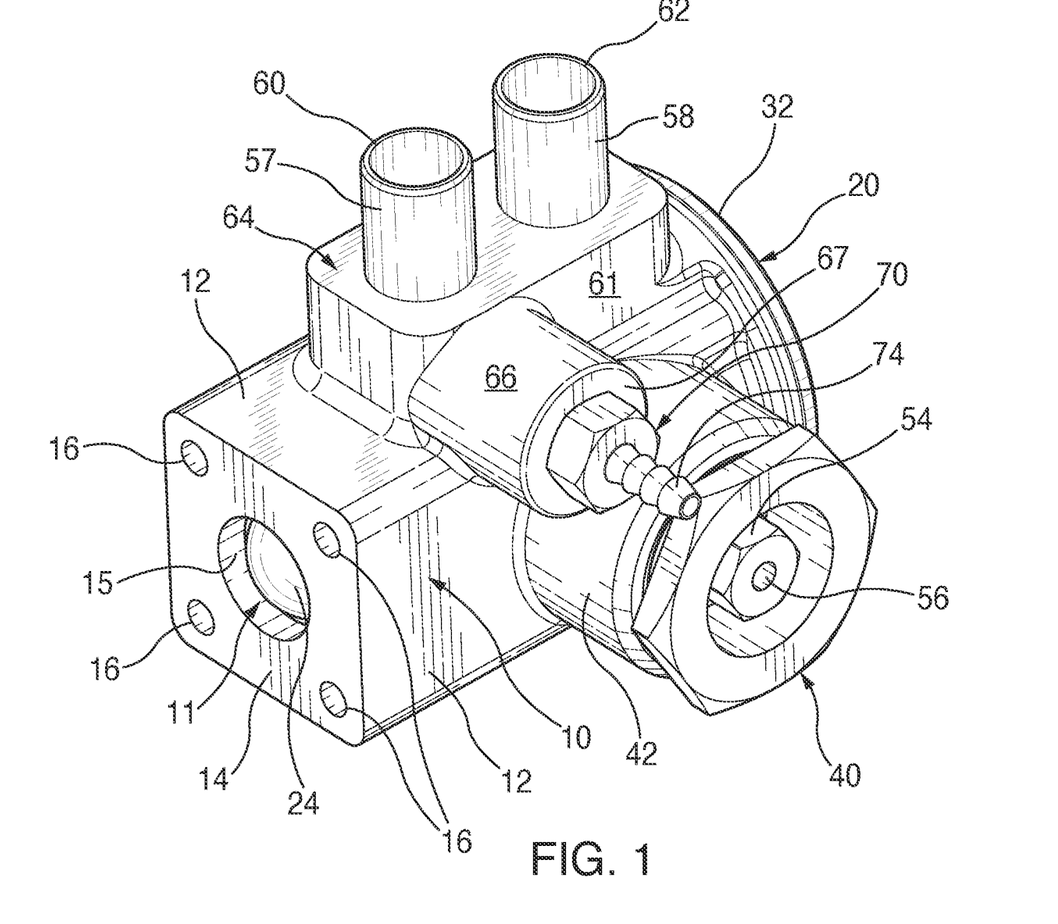
FIG. 1 is a front, top and side perspective view of the combination check and relief valve assembly embodying the present invention.
Figures 2, 3:
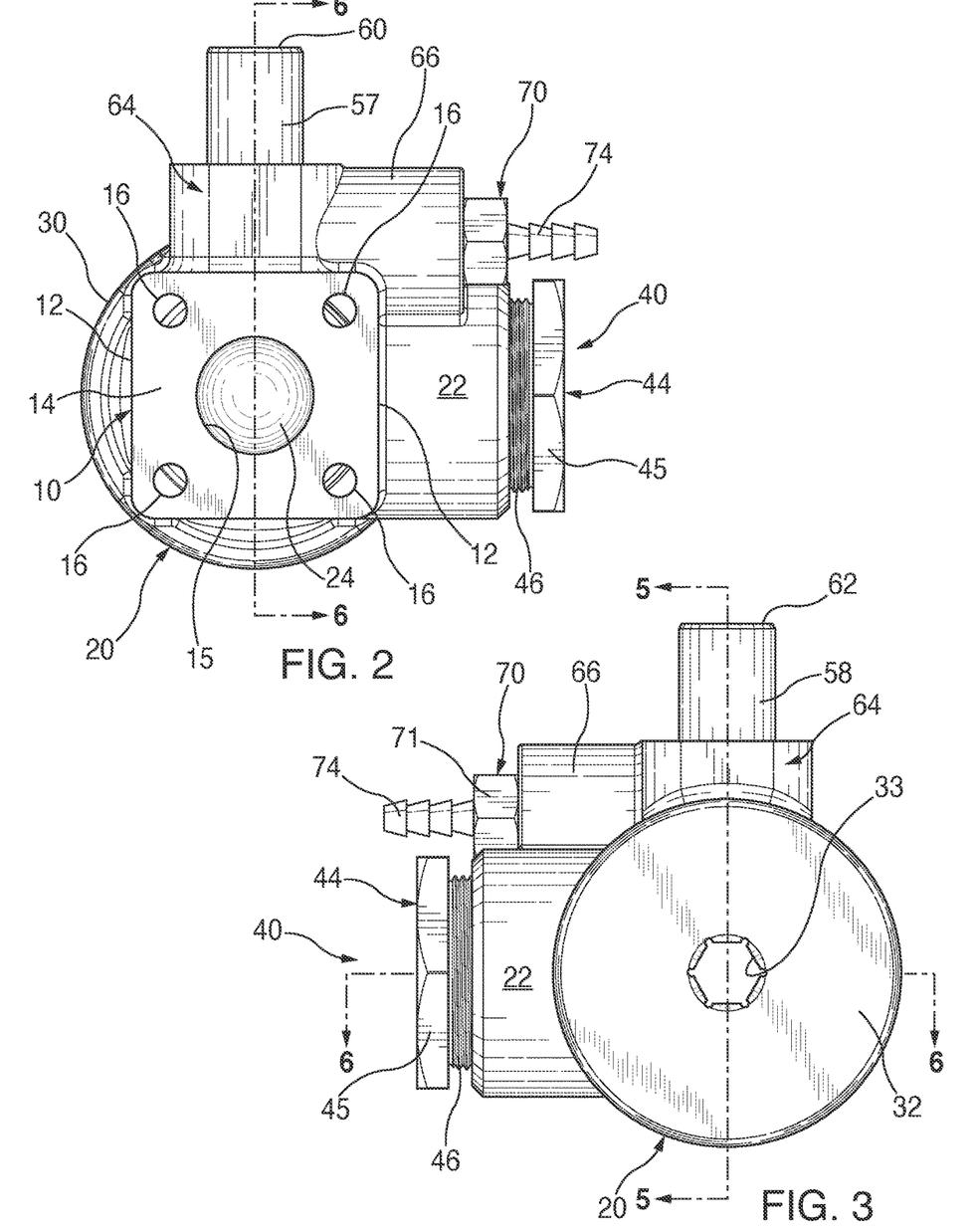
FIG. 2 is a front elevational view of the valve assembly shown in FIG. 1.
FIG. 3 is a rear elevational view of the valve assembly shown in FIG. 1.

Turning now in detail to the drawings, therein illustrated is a novel combination check and relief valve assembly (hereinafter sometimes referred to as "check-relief valve assembly") preferably mounted within a single discharge manifold for gas discharge devices and, in particular, blowers embodying the present invention. As shown in FIGS. 1-3, the combination check-relief valve assembly comprises an elongated generally rectangular, hollow manifold generally designated 10 having four generally rectangular sidewalls 12, a square-shaped, planar inlet face 14 with four, spaced-apart, non-threaded bolt holes 16 for bolting the manifold into four internally-threaded holes on the planar discharge port face of a blower (not shown). A preferably circular, central opening 15 is formed through inlet face 14 of manifold 10 which serves as an inlet for receiving the fluid discharge flow from the discharge port of a blower.

Figure 4:
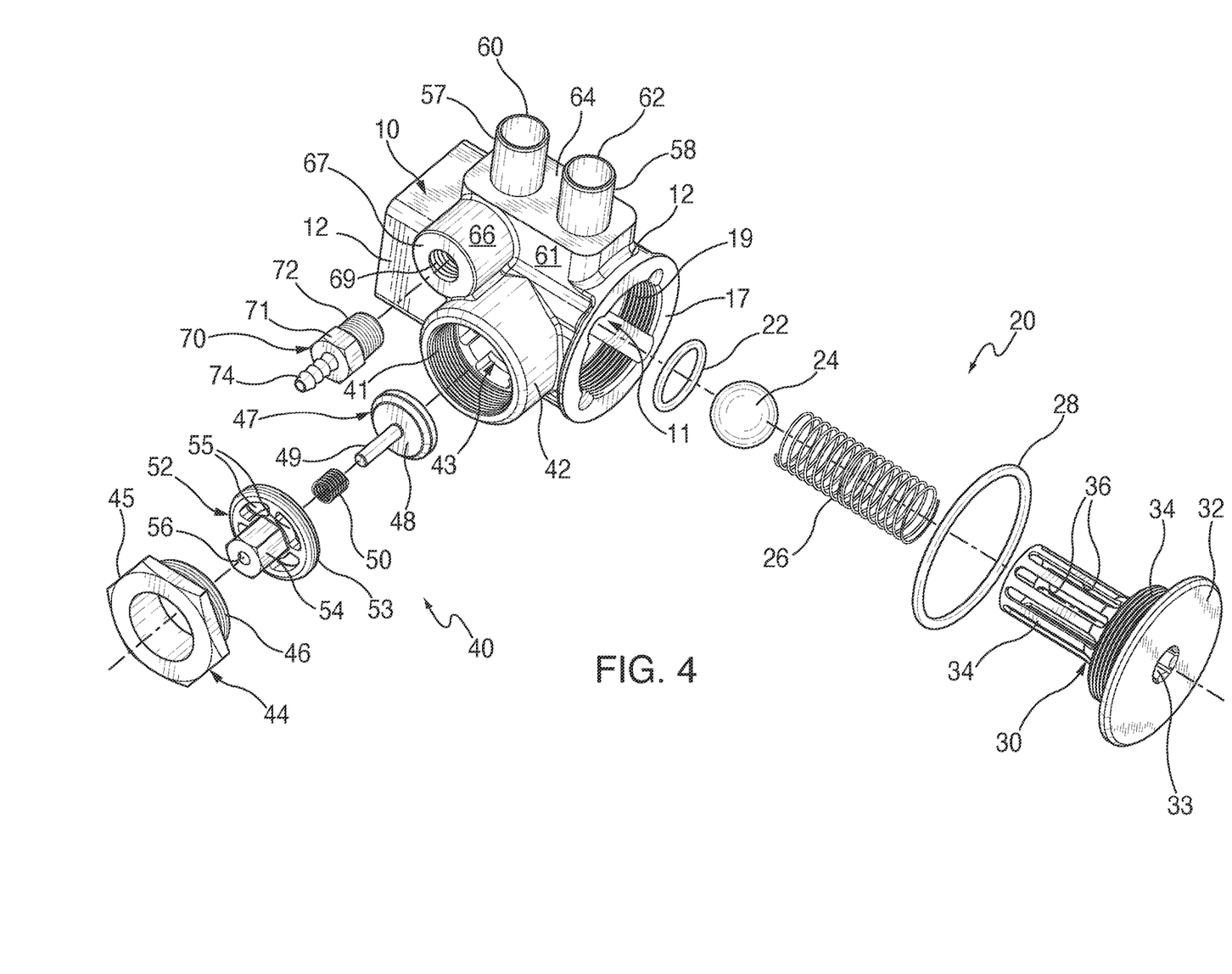
FIG. 4 is an exploded, rear, top and side perspective view of the valve assembly shown in FIG. 1.
Figure 5:
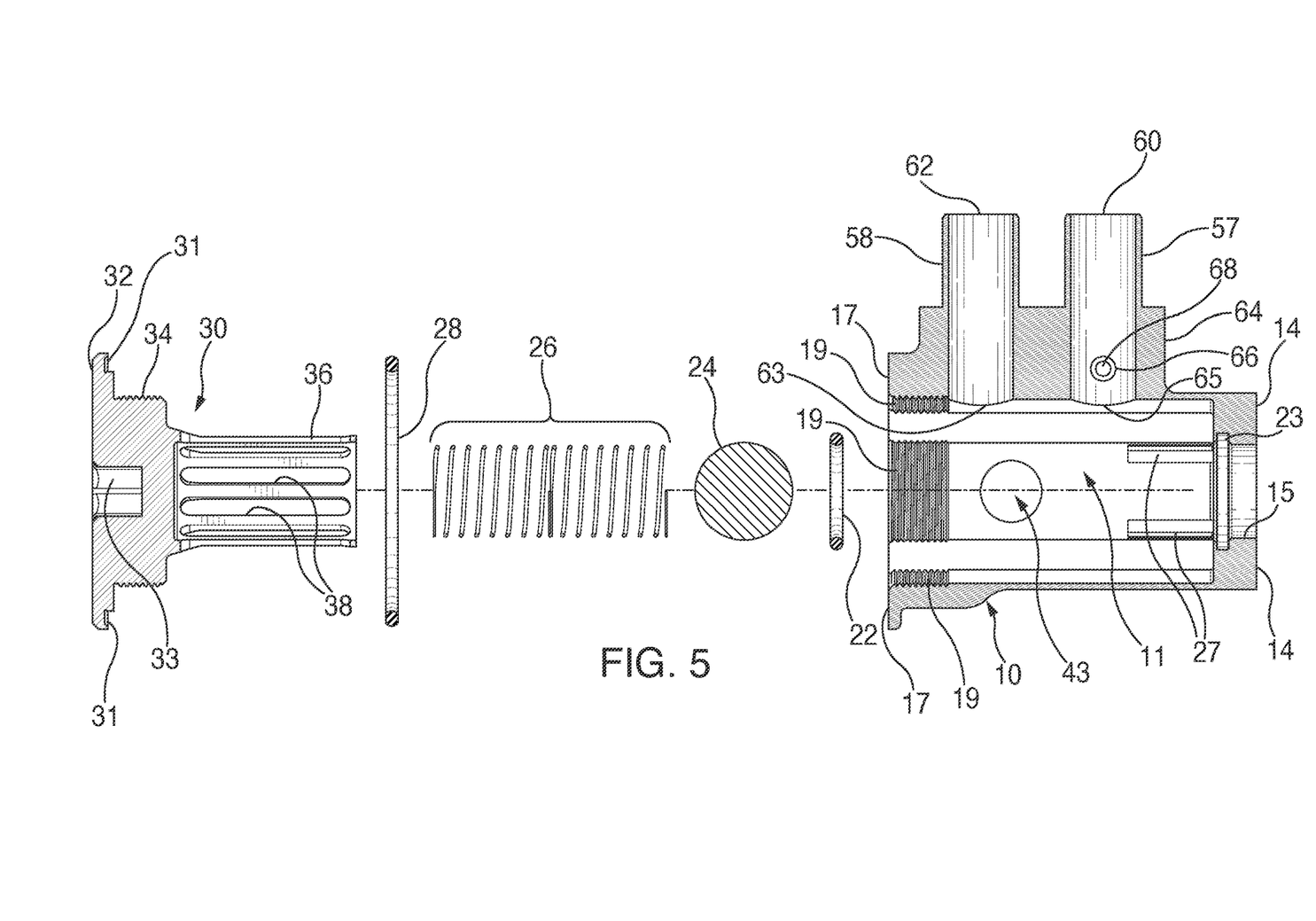
FIG. 5 is an exploded, cross-sectional view of the check valve assembly taken along line 5-5 shown in FIG. 3.

As seen in FIGS. 4 and 5, manifold 10 has a central main chamber or passageway 11 formed therein extending therethrough from the inlet opening 15 to planar, ring-shaped rear face 17 having an inner, internally-threaded, annular portion 19 for threaded receipt therein of a check valve assembly generally designated 20. As best seen in FIG. 4, the check valve assembly 20 comprises a relatively small O-ring 22, a preferably plastic spherical ball 24 made of PTFE, a coil spring 26, a relatively large O-ring 28, and a tension adjustment device generally designated 30. The tension adjustment device 30 comprises an enlarged, outer planar and circular end cap 32 to which is affixed an externally-threaded, annular inner portion 34 intended for threaded engagement with internally-threaded, cylindrical annular portion 19 adjacent rear face 17 of manifold 10. The tension adjustment device 30 also has a slotted, cylindrical wall or cage 36 mounted within chamber 11 having a multiplicity of spaced-apart, elongated, slotted openings 38 which allow fluid discharge flow therethrough into interior chamber 11.

As further illustrated in FIGS. 1-5, manifold 10 has preferably two cylindrical stacks 57, 58 that are mounted in a raised rectangular housing 64 on a wall 12 atop manifold 10. At their inner open ends 63, 65, discharge stacks 57, 58 merge and communicate with the main internal chamber or passageway 11 of manifold 10 preferably at a right angle thereto. Their outer ends define discharge ports 60, 62 for allowing fluid discharge flow to exit therefrom to the ambient atmosphere.

Optionally, an air pressure gauge (not shown) can be used to measure the pressure in one of the discharge stacks, in this case stack 58, via removable attachment thereof to a hollow cylindrical housing 66 attached to a sidewall 61 of raised rectangular housing 64 of manifold 10. Cylindrical housing 66 has a central bore 68 (FIG. 5) extending from, and perpendicular to, and through, the interior wall of discharge stack 58 through cylindrical housing 66 and opening onto its outer face 67. The bore 68 of cylindrical housing 66 has an internally-threaded, outer free end portion 69 to which the threaded inner end 72 of a vent plug 70 is rotatably and threadably attached (FIG. 4). The vent plug 70 has a hexagonal-nut-shaped neck portion 71 which can be rotated via hand or a tool to effect threaded engagement of its threaded end 72 into the internally-threaded outer free end portion 69. Vent plug 70 has a ribbed nozzle 74 on which the inlet hose of the air pressure gauge (not shown) can be removably and frictionally secured for monitoring the internal discharge pressure of manifold 10.

Figure 6:
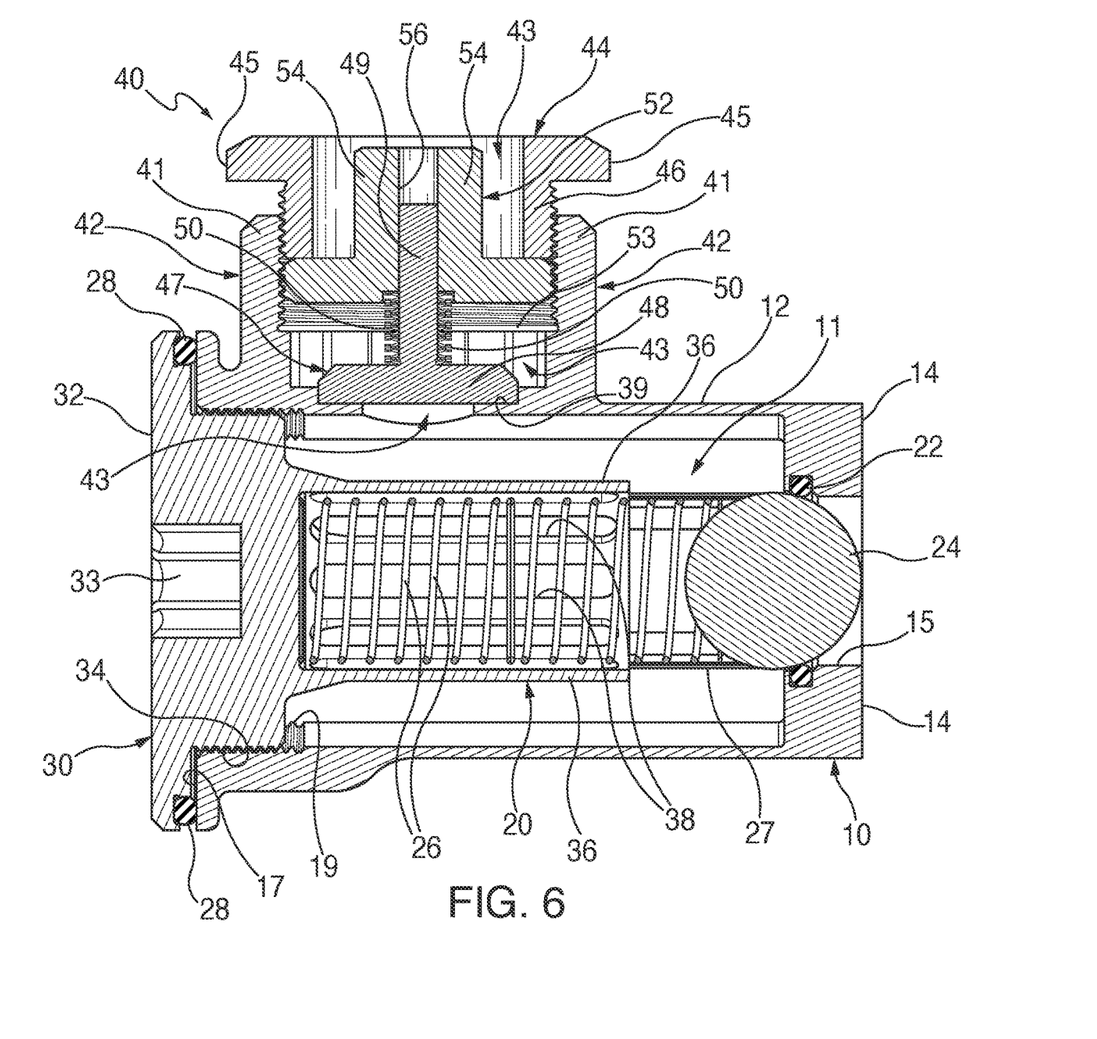
FIG. 6 is a cross-sectional view of the check and relief valve assembly taken along line 6-6 shown in FIG. 3.

As further illustrated in FIGS. 5 and 6, circular inlet port 15 in inlet face 14 leads into elongated, rectangular main chamber or passageway 11. Inlet port 15 has an O-ring 22 received in a U-shaped, annular channel 23 formed on the inner end of inlet 15 against which ball 24 normally rests when in a biased closed position, relative to inlet port 15 (FIG. 6). In this position, ball 24 is biased by one end portion of coil spring 26 which is partially mounted for sliding motion within a cylindrical channel or cut-out 27 of manifold chamber 11 disposed adjacent to O-ring annular channel 23 in inlet 15. The opposite end portion of coil spring 26 is received with the interior channel defined by the slotted cylindrical cage 36 of tension adjustment device 30. Cage 36 is affixed to the threaded cylindrical inner portion 34 of end cap 32. The threaded inner cylindrical portion 34 of end cap 32 is threadably received in the threaded outlet 19 at the rear end face 17 of manifold 10.

As seen best in FIGS. 5 and 6, the large O-ring 28 is received within a cylindrical channel defined collectively by the peripherally-extending, annular L-shaped step 31 on the underside periphery of end cap 32 and the opposing peripherally-extending flange of rear face 17 of manifold 10. The axial position of end cap 32 is adjustable via rotational threaded engagement of its cylindrical portion 34 with threaded outlet 19 of manifold 10. Upon clockwise turning thereof into chamber 11, it applies a progressively greater compressing force on coil spring 26 which, in turn, biases ball 24 against the seat or upon counter clockwise turning, it moves outwardly of chamber 11 and it progressively applies a lesser compressive force on ball 24.

More particularly, in operation, when discharge fluid flow from the blower enters the manifold 10 at inlet 15, the ball 24 of the check valve assembly 20 is pushed back in accordance to the set pressure of the compression spring 26. This allows for an opening to be formed at the inlet 15 which the fluid can enter and travel without obstruction through channel 11 and then at a right angle thereto, enter into the open inner ends 63, 65 of discharge stacks 57, 58 and out of the two discharge port outlets 60, 62 to the atmosphere. Inlet 15 can become blocked and closed by ball 24 if the pressure within fluid channel 11 inside the manifold 10 becomes low enough that the spring force set on the ball 24 via the compression spring 26 is greater than the pressure from the fluid flow within manifold 10.

The pressure within manifold 10 required to open and close the fluid flow through inlet 15 that is created by the force upon the spring-biased ball 24 can be adjusted by inserting an Allen key (not shown) into Allen key port 33 formed in the front face of the end cap 32 and then rotating the end cap 32 and, in turn, the cylindrical slotted cage 36 of the tension adjustment device 30 inwardly to compress the compression spring 26 to increase the spring force on ball 24 and, consequently, to increase the force needed to be generated by the pressure from the discharge of the blower required to open the manifold channel 11 via the inlet 15. Alternatively, the Allen key can be used to rotate the end cap 32 counterclockwise out of the manifold to reduce the compression force applied by the compression spring on ball 24 to decrease the force generated by the pressure from the discharge of the blower required to open the manifold channel 11 at the inlet 15.

As seen in FIG. 4, the relief valve assembly 40 comprises a generally cylindrical relief valve cap generally designated 44, having an enlarged outer end portion 45 with a hexagonal periphery or profile which merges with a reduced diameter, externally-threaded inner neck portion 46 which is sized and dimensioned for threaded engagement with internally-threaded inner surface of outer face end portion 41 of cylindrical housing 42. The hexagonal outer portion 45 can be easily rotated by hand or turned with a tool, such as a wrench, to effect threaded engagement of its threaded neck portion 46 with the internally-threaded inner surface of outer free end portion 41 of cylindrical housing 42 of manifold 10. The relief valve assembly 40 further includes a preferably metal plunger 47. Plunger 47 has a circular, disc-shaped inner end 48 to which a cylindrical rod or spindle 49 is attached axially thereto. A compression coil spring 50 is mounted on the spindle 49. The assembly further includes an externally-threaded wheel 52 having through slots 55 and a hexagonal shaft 54 attached axially thereto which has a cylindrical throughbore 56 to allow the spindle 49 to be slidably mounted therein with spring 50 sandwiched between plunger head 48 and wheel 53.

As seen best in FIG. 6, when fully mounted, the relief valve assembly 40 is threadably mounted in manifold cylindrical housing 42 via the externally-threaded inner portion 46 of relief valve cap 44 being threadably engaged with the internally-threaded surface of the outer free end portion 41 of cylindrical housing 42. In its normal closed position, the disc-shaped head 48 of plunger 47 is disposed against an L-shaped circular step 39 formed on the inner end of cylindrical housing 42 defining a valve seat for plunger 47 which normally closes off the channel 43 of cylindrical housing 42 at its inner end. The plunger 47 is biased against the valve seat 39 by the compression spring 50 received on the shaft 49 of plunger 47 and sandwiched between the inner end of the tension adjustment device 52 and the disc-shaped plunger head 48. Preferably, the relief valve assembly is oriented so that its inner chamber 43 communicates with and intersects the manifold main chamber 11 at a right angle thereto.

Relief valve 40 creates an opening for fluid to flow through once the pressure inside the manifold channel 11 builds up to a pre-determined excessive level sufficient to generate a force on the metal plunger 47 that is biased by the compression spring 30 to normally assume a closed position. The force required to open the relief valve opening can be increased by rotating the hexagonal outer end portion 45 of relief valve cap 44 clockwise, preferably via a tool such as a wrench (not shown), into the manifold 10 to compress the compression spring 30 and increase the spring force of spring 30 on plunger 47 to, in turn, increase the buildup of pressure from the discharge of the blower required to raise plunger 47 from seat 39. This allows fluid to flow at right angles from chamber 11 through the opening in the valve seat 39 through channel 43 and the slots 55 (FIG. 4) in the externally-threaded wheel 53 of tension adjustment device 52, whereby the fluid discharge is then vented through channel 43 of relief valve cap 44 to the atmosphere or surrounding environment. On the other hand, the tool could be used to rotate the hexagonal ring-shaped head 45 of relief valve cap 44 of the tension adjusting device 52 counter-clockwise out of the cylindrical housing 42 and manifold 10 to reduce the biasing force of the compression spring 48 on plunger 47 so that the force needed to be generated by the excessive pressure buildup to open the relief valve is lowered.

Thus, as can be seen from the foregoing, during its operation, the check-relief combination valve regulates the pressure from the exhaust of the blower. Depending on the compression setting on the respective springs of the check valve and the relief valve of the manifold, the pressure level of the exhaust can be maintained within a certain preferred, pre-determined range.

It is to be understood that the above-mentioned figures are only illustrative of the application of the principles of the present disclosure. Numerous modifications or alternative arrangements may be devised by those skilled in the art without departing from the spirit and scope of the present disclosure. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein. For instance, the materials, configuration, dimensions and types of the valve assembly described and shown above, and their parts, can be modified or substituted for one another, for particular applications when so needed or desired. For example, although the valve ball is preferably made for PTFE, it can be made of other plastics or other materials depending upon the particular application. Similarly, although the plunger 47 is preferably made of metal, it could also be made of other materials such as plastic or a composite material. In addition, although the end cap and the check valve preferably have an Allen key port to allow for insertions of an Allen key to facilitate turning thereof, the end cap could be modified to accept other conventional tools for effecting rotation thereof. Similarly, the shaft 54 of wheel 52 can have other shapes aside from hexagonal to accept a variety of differently configured conventional tools for effecting rotation thereof.

It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily superior" and "inferior".

Accordingly, it is to be understood that the embodiment of the invention herein described is merely illustrative of the application of the principles of the invention. While a particular embodiment of the invention have been described, it is not intended that the invention be limited thereto, as it is intended that the invention be as broad in scope as the prior art will allow and that the specification be read likewise.

What is claimed is:

1. A combination check and relief valve assembly for maintaining a predetermined pressure range at the fluid discharge outlet port of a blower comprising: a manifold having an inlet port for receiving the fluid discharge from an outlet port of the blower and a discharge port for discharge of the fluid discharge of the blower, a hollow interior chamber defining a passageway from said inlet port to said discharge port of said manifold for the fluid discharge from the blower and a relief vent port in communication with said interior chamber of said manifold and wherein said manifold has a side channel having an inner open end opening onto said interior chamber thereof and an outer open end which is internally-threaded and wherein said inner end thereof is dimensioned and configured to define a valve seat for a plunger; a check valve mounted in said manifold for preventing a backflow of the fluid discharge back through said inlet port upon an excessive pressure drop in said chamber of said manifold; and a relief valve mounted in said manifold for releasing and venting the fluid discharge of the blower through said relief vent port in said manifold to the atmosphere upon an excessive pressure buildup in said chamber of said manifold of the fluid discharge received from the blower, said relief valve comprising a plunger movable reciprocately between a normally closed position relative to said relief vent port in which it blocks the fluid discharge through said relief vent port and an open position in which it is spaced from said relief vent port to permit fluid discharge through said relief vent port and a coil spring for normally biasing said plunger into said closed position, and wherein said plunger has an enlarged disc-shaped plunger head having an inner face and an outer face, the latter of which is configured for mating sealing engagement with said valve seat defined by said inner open end of said side channel, and an axially-aligned shaft coupled to said inner face of said plunger head and wherein said coil spring is disposed on said shaft, and relief valve tension adjustment means for adjusting the compressive force applied by said coil spring on said plunger head, said relief valve tension adjustment means comprising a wheel having a threaded periphery for threaded engagement with said internally-threaded outer end of said side channel of said manifold and a central hub having an axially-extending throughbore in which said shaft of said plunger is slidably mounted so that said relief valve coil spring is disposed and extends between said adjustment wheel and said plunger head.

2. The valve assembly according to claim 1, wherein said adjustment wheel has a plurality of radially-spaced-apart holes arranged between said central hub and said threaded periphery thereof.

3. The valve assembly according to claim 2, wherein said relief valve additionally includes an end cap having an externally-threaded cylindrical inner end portion threadably engageable with said internally-threaded outer end of said side channel of said manifold and having a central opening which communicates with said holes of said adjustment wheel and, in turn, said inner open end of said side channel to permit the release and venting of the fluid discharge of the blower through said side channel and said central opening of said end cap upon an excess pressure build up in said chamber of said manifold of the fluid discharge from the blower.

4. The valve assembly according to claim 3, wherein said end cap has a circular-shaped periphery.

5. The valve assembly according to claim 1, wherein said manifold inlet port is generally cylindrical and defines a generally circular inlet port having an annular inner portion which is configured and dimensioned to define an annular check valve seat and wherein said check valve comprises a valve ball reciprocally movable between a normally closed position relative to said check valve seat in which it blocks said inlet port and an open position in which it is spaced from said check valve seat to allow the fluid discharge from the blower to enter said inlet port, flow into said interior channel of said manifold and exit through said discharge port of said manifold.

6. The valve assembly according to claim 5, wherein said check valve additionally including a check valve coil spring for normally biasing said valve ball into said closed position thereof.

7. The valve assembly according to claim 6, wherein said check valve additionally includes check valve tension adjustment means for adjusting the compressive force applied by said check valve coil spring on said valve ball.

8. The valve assembly according to claim 7, wherein said manifold is elongated and has a front end and a rear end wherein said inlet port is formed in said front end thereof and said rear end defines a cylindrical rear opening which is internally threaded.

9. The valve assembly according to claim 8, wherein said check valve tension adjustment means additionally includes a cylindrical end cap having an outer enlarged head portion and a reduced diameter, externally-threaded inner neck portion.

10. The valve assembly according to claim 9, wherein said check valve end cap has a slotted cylindrical cage secured to said inner neck portion of said check valve end cap which is configured and dimensioned for receipt therein of a portion of said check valve coil spring so that said check valve coil spring is sandwiched between said cage and said ball.

11. The valve assembly according to claim 10, wherein said check valve end cap has an Allen key port formed therein to facilitate rotational adjustment of said check valve end cap in said rear end of said manifold whereby the internal pressure required to open said check valve can be raised or lowered.

12. The valve assembly according to claim 10, wherein said manifold has a rectangular front end portion which defines said generally circular inlet port of said manifold and wherein said annular inner portion thereof defines a shoulder which serves as said check valve seat.

13. The valve assembly according to claim 12, wherein said check valve additionally includes an O-ring disposed adjacent to said annular inner portion to effect sealing engagement thereof with said ball when in its normally closed position thereof, and wherein said check valve additionally includes a second O-ring mounted between said end cap and said rear end of said manifold to effect sealing engagement therebetween.

14. The valve assembly according to claim 9, wherein said manifold has a generally rectangular main housing and a second discharge port adjacent to, but spaced from, said discharge port.

15. The valve assembly according to claim 14, wherein said manifold has dual tubular exhaust stacks extending outwardly from, and generally perpendicular to, said manifold one of which defines said discharge port and the other of which defines said second discharge port, and wherein said stacks each have an inner end in communication with said interior chamber of said manifold and are generally disposed at a right angle to said elongated manifold.

16. The valve assembly according to claim 12, wherein said front end portion has a plurality of bolt holes for the receipt therein of a plurality of bolts for attaching said manifold to a blower.

17. The valve assembly according to claim 15, wherein said manifold has a hollow cylindrical side extension having a throughbore with an inner open end extending into one of said stacks and an internally-threaded, outer open end and said valve assembly additionally includes a pressure gauge connector that has an externally-threaded inner end for threaded engagement with said outer open end.

18. The valve assembly according to claim 17, wherein said ball and said O-rings in said check valve assembly are made from PTFE.

* * * * *